June 13, 1939.  LE ROY S. DUNHAM ET AL  2,161,954
MAGNETO ELECTRIC GENERATOR
Filed March 31, 1937  4 Sheets-Sheet 1
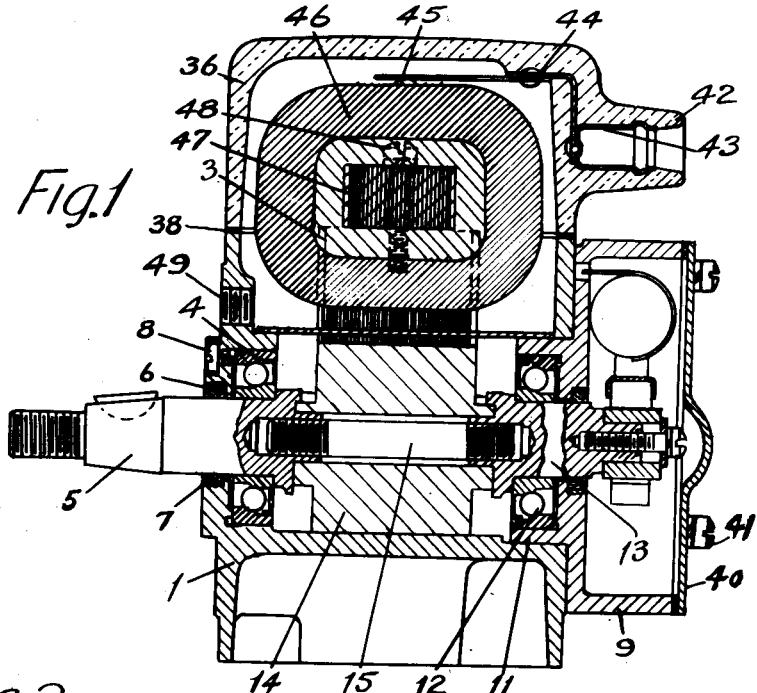
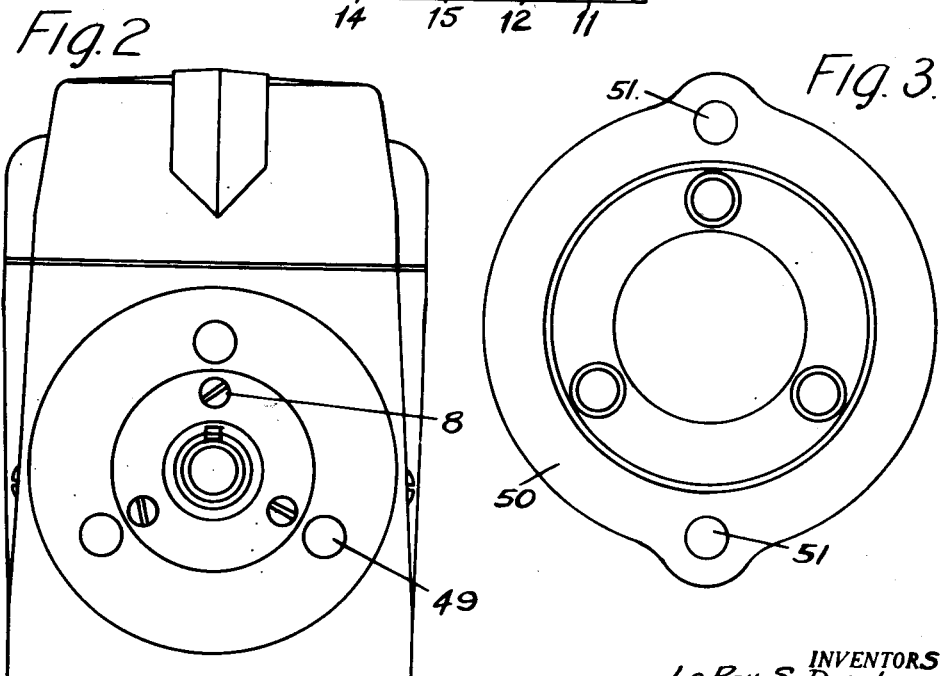
INVENTORS
Le Roy S. Dunham
Arthur F. Robertson
BY
A. D. F. Libby
ATTORNEY June 13, 1939.　　LE ROY S. DUNHAM ET AL　　2,161,954
MAGNETO ELECTRIC GENERATOR
Filed March 31, 1937　　4 Sheets-Sheet 2
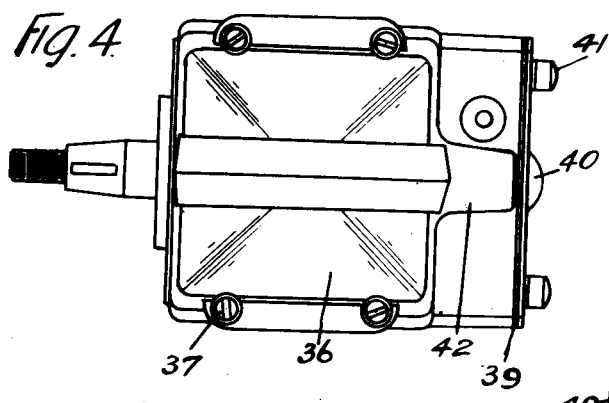
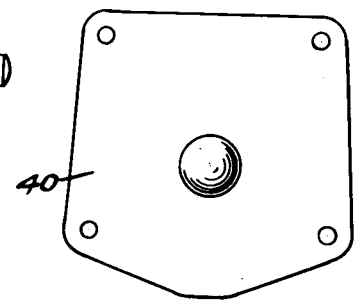
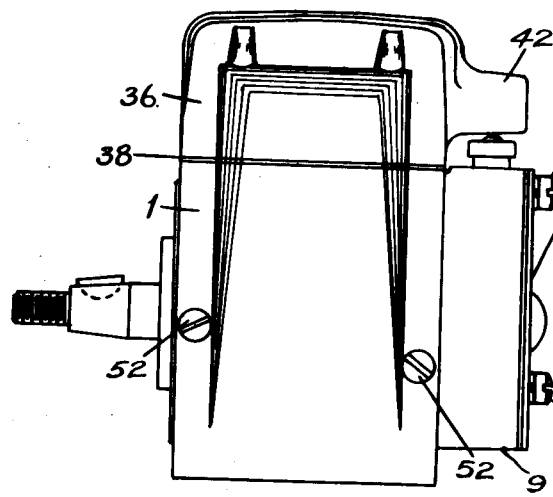
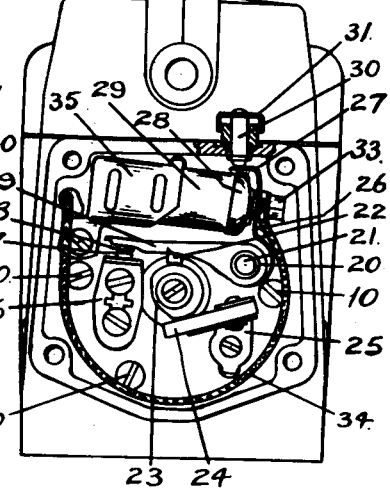
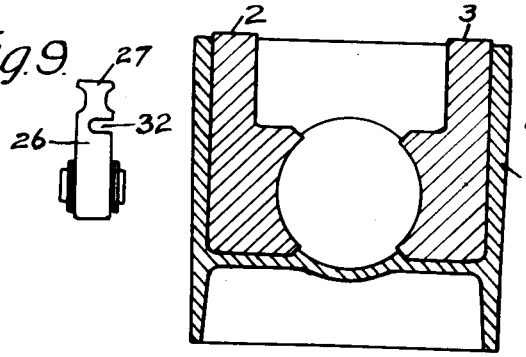
INVENTORS.
Le Roy S. Dunham.
Arthur F. Robertson.
BY
A. & J. Libby
ATTORNEY

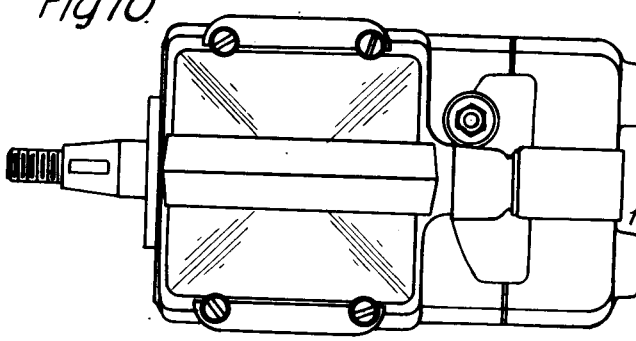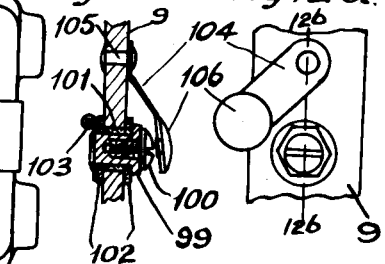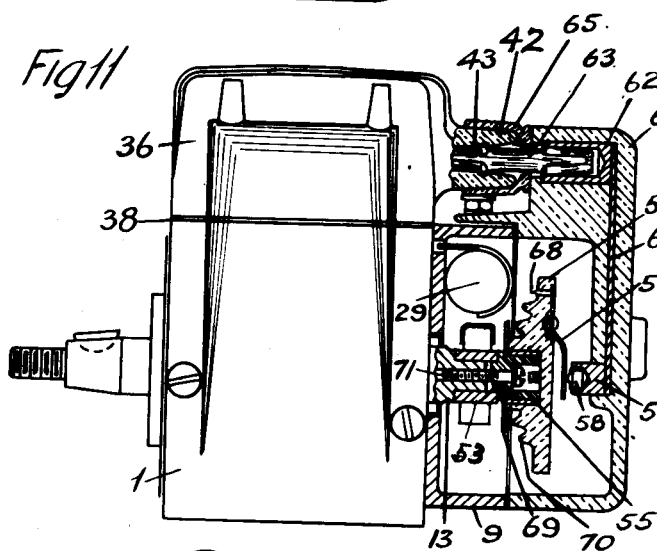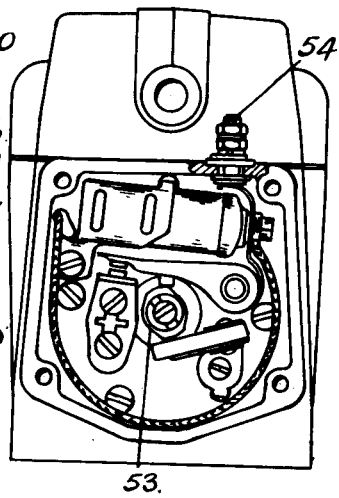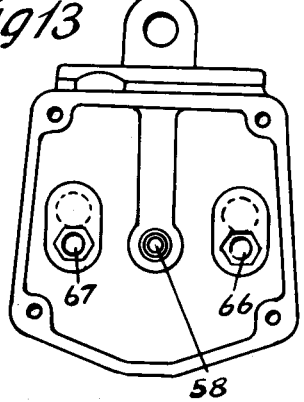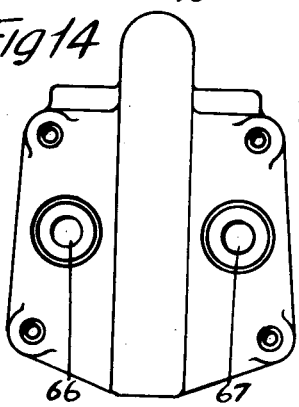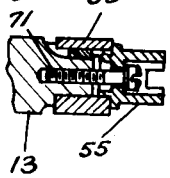

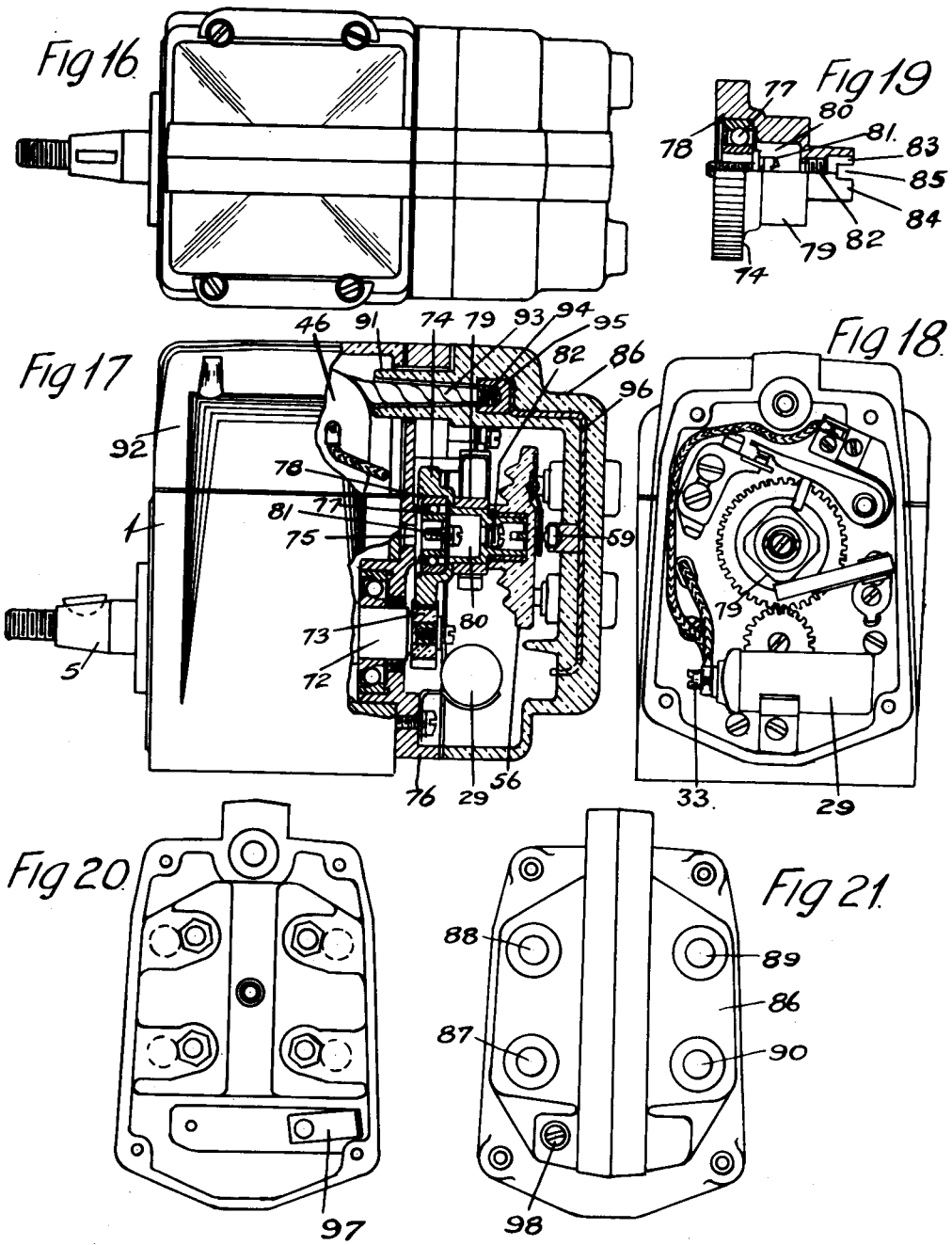

Patented June 13, 1939

2,161,954

UNITED STATES PATENT OFFICE 2,161,954

MAGNETO ELECTRIC GENERATOR

Le Roy S. Dunham, East Orange, and Arthur F. Robertson, Belleville, N. J., assignors to Edison-Splitdorf Corporation, West Orange, N. J., a corporation of New Jersey Application March 31, 1937, Serial No. 134,050

12 Claims. (Cl. 171—209)

This invention relates to an electric generator of the magneto type, particularly one having a rotating permanent magnet.

It is the principal object of our invention to provide a magneto in which a frame structure, which we term the foundation unit, can be used with different types of machines, that is to say, machines which will deliver a single spark or a plurality of sparks for firing charges in multicylinder engines.

By utilizing a foundation frame unit, a line of ignition generators can be built up from this frame and cooperating parts, thus greatly reducing the number of parts and the cost of manufacture. Since this unit frame and other parts can be used in the different styles of magnetos, we shall refer to the same herein as a convertible magneto, because it has characteristics somewhat similar to those set forth in our Patent 1,988,724, issued January 22, 1935.

The changes by which the different styles of machines may be developed from the foundation unit will be understood by reference to the annexed drawings, wherein:

Figure 1 is a longitudinal, sectional view, substantially full-size, through a single cylinder magneto.

Figure 2 is a view of the drive or left-hand end of Figure 1.

Figure 3 is an end view of a flange adapted to be applied to the drive end of the magneto shown in Figures 1 and 2.

Figure 4 is a top plan view of the magneto of Figure 1, on a reduced scale.

Figure 5 is a side elevation, on a reduced scale, of the magneto shown in Figure 1.

Figure 6 is a view of the closure plate used at the circuit breaker end of the magneto of Figure 1.

Figure 7 is a diagrammatical view of a partial section through the frame member and showing the field pole pieces.

Figure 8 is a view of the magneto shown in Figure 5, with the end plate of Figure 6 removed.

Figure 9 is a side elevation of one of the details shown in Figure 8.

Figure 10 is a top plan view of a two-cylinder magneto.

Figure 11 is a side elevational view of Figure 10, showing the vertical transverse section through the circuit breaker and distributor end of the machine.

Figure 12 is an end view of the distributor and breaker end of the machine of Figure 11, with the distributor block and distributor disc removed.

Figure 12a is a plan view of a combination ground terminal and switch, the switch being moved from normal position.

Figure 12b is a section on the line 12b—12b of Figure 12a, with the switch member in normal position.

Figure 13 is an interior view of the distributor block of the machine shown in Figures 10, 11 and 12.

Figure 14 is an end view of the distributor block, looking from right to left of Figure 10.

Figure 15 is a full-size, sectional view showing the method of holding the cam and distributor disc carrier to the rotor shaft as in Figure 11.

Figure 16 is a top plan view of a four-cylinder magneto.

Figure 17 is a part-elevational and part-sectional view of the magneto shown in Figure 16.

Figure 18 is a view of the breaker end of the magneto of Figure 17, with the distributor block and distributor disc removed.

Figure 19 is a part-elevational and part-sectional view through a modified form of distributor gear such as shown in Figure 17.

Figure 20 is an interior view of the distributor block used in the four-cylinder magneto of Figures 16 and 17.

Figure 21 is an end view of the distributor block looking from right to left of Figure 16.

In the various views, wherein like numbers refer to corresponding parts, 1 is a frame comprising the foundation unit of the different styles of magnetos to be hereinafter described. The frame 1 is prefeerably cast from suitable non-magnetic material with the field core pole pieces 2 and 3 moulded therein. Fitting in the drive end of the frame 1, is an anti-friction bearing 4 for carrying the drive-end 5 of the rotor. Preferably the frame 1 carries suitable packing material 6 adjacent the bearing 4 to prevent the lubricant from working out along the shaft end 5. The packing 6 is held in place in any satisfactory manner as by a collar 7 press-fitted into the frame 1. For disassembly purposes, the frame 1 is provided with a plurality of screws 8, three being shown, which may be removed so that a suitable tool may be inserted in these holes for forcing the bearing 4 out of the frame.

As shown in Figure 1, the opposite or breaker end of the frame 1 has fastened thereto a housing member 9. The fastening means, as shown in Figure 8, includes a plurality of screws 10. The housing member 9 has a concentric hub 11 adapted to snugly fit or dowel into the frame 1. The hub portion 11 carries an anti-friction bearing 12 for supporting the breaker shaft end 13 of the rotor. The interiorly projecting portions of the shaft ends 5 and 13 cooperate with a permanently magnetic rotor member 14, being fastened thereto in any suitable way, several of which are set forth in our copending applications, Serial No. 26,686, filed June 14, 1935, and allowed November 6, 1936 now Patent No. 2,081,800 issued May 25, 1937; and Serial No. 130,496, filed March 12, 1937, so that further description thereof does not seem to be necessary herein. The material comprising the magnet 14 may be of any suitable kind, but we prefer to use a combination of aluminum, nickel, iron, and in some cases, cobalt, giving a magnet having very high coercive force.

Mounted on the housing member 9 is an adjustable circuit breaker element 16 having a contact 17 for cooperation with a contact 18 carried on a breaker arm 19. Since the bracket or breaker element 16 is mounted directly to the frame of the magneto, the breaker arm 19 is insulated by an insulator 20 from its pivotal stud 21 carried by the housing 9. The breaker arm 19 carries a bumper 22 adapted to be engaged by a cam 23 to which lubrication is applied by a felt wick member 24 supported by a bracket 25 fastened to the housing 9. A spring 26 has one end fastened to the movable arm 19 and its free end 27 is bent over one end of the metallic shell 28 which carries a condenser 29 and is in contact with an insulated plunger 30 having a cap or button 31 used for pushing the plunger 30 so as to force the end 27 of the spring 26 into contact with the metal shell 28 of the condenser 29, thereby grounding the spring which has a slot 32 therein adapted to engage and be fastened to an insulated stud 33 forming one terminal of the condenser 29. The same stud 33 acts as an anchorage for one end of the cable 34 coming from the primary of the ignition coil, so that the primary circuit is completed through the cable 34, the contact stud 33, spring 26, breaker arm 19, contacts 18 and 17, to the grounded bracket 16, it being understood that the opposite end of the primary of the ignition coil is grounded to the core of the coil, the same being fastened to the frame 1 of the machine.

The condenser 29 is fastened in the housing 9 by a clamp 35, the opposite terminal or connection to the condenser being made through this clamp.

Positioned on the top of the frame 1, is a coil cap 36, the same being fastened to the frame 1 by a plurality of screws 37. A gasket 38 is used between the frame 1 and the cap 36 to make a water and dust-proof seal at this point, while the breaker end of the machine is sealed by a gasket 39 under the cover plate 40 which is held to the housing 9 by screws 41. The cap 36 has a projection 42 within which is located a metallic terminal member 43 having connecting means 44 extending to a contact member 45 which is the terminal end of the high-tension winding on the coil 46, the same having a core 47 fastened to the field poles 2 and 3 in any satisfactory manner as by screws 48.

The drive end of the frame 1 is provided with threaded screw holes 49 for mounting a member of an impulse coupling or to receive a flange 50 having holes 51 therein which may be utilized to mount the entire magneto. It is to be understood, however, that the base of the frame 1 is provided with suitably tapped holes, not shown in the drawings, so that the magneto can be mounted from the base in the usual way. It may also be mentioned that the frame 1 is provided with screws 52 located in planes in alignment or including the bearings 4 and 12. On removing the screws, oil may be passed through the screw holes to these bearings. Preferably both sides of the frame 1 are provided with screws 52 so that no matter which way the magneto is mounted, at least one pair of screws will be readily available for lubricating the bearings.

Coming now to the convertibility of the magneto previously described, and referring to Figures 10 to 15 inclusive, the frame 1 is the same as for the single cylinder magneto previously described; likewise, the cap 36 and method of holding it to the frame 1 is the same; the rotor with its magnet is the same, and the housing member 9 is the same. The cam 53, however, is different in that it has two lobes instead of one. Other than this, the circuit breaker parts, cam wiper and condenser are the same, but a slightly different grounding stud 54 may be used, although the same grounding stud as shown in Figure 8 can be used.

In Figure 12, the stud 54 is of the non-movable type so that a conductor may be attached thereto and run to a switch for controlling the operation of the magneto.

In Figures 12a and 12b, there is shown a combination grounding terminal and switch. The terminal per se includes a flanged bushing 99 passing through the wall of the housing member 9, but insulated therefrom by a bushing 101 and insulating washers 102, the inner end being riveted over a terminal 103 to which one end of the primary winding of the ignition coil is connected. The opposite end of the flange member 99 is tapped to receive a screw 100, under the head of which, or under a washer which may be used, a conducting wire may be attached, this wire leading to a grounding switch at some convenient point; or a switch lever 104 riveted at 105 to the housing 9 may be used, in which case the free end of the lever 104 is provided with an engagement head 106 riveted thereto. When the ground wire is used as described, the switch lever 104 may be swung to one side as shown in Figure 12a; or the switch lever 104 may be in its normal operative position as shown in Figure 12b, so that the sparking of the magneto may be controlled by a remote switch or by the switch at the magneto.

To the end 13 of the rotor shaft is attached, by a screw 71, referring to Figures 11 and 15, an adaptor or disc carrier 55 on which is slidably positioned a distributor disc 56 having an arcuate segment with a contact strip 57 to engage a renewable button or contact 58 located in alignment with the axis of the rotor. The contact button 58 is carried in a metallic holder 59 positioned in the distributor block 60 and connected by a conductor 61 moulded in the block 60 to a metallic insert 62 which, through a connector 63, makes electrical connection with the contact member 43 in the projection 42 extending from the coil cover 36. Preferably a soft rubber grommet 65 is used to complete a watertight connection between the projection 42 and the distributor block 60. The distributor block 60 is provided with two socket type terminals 66 and 67 for leading out the high-tension current from brushes positioned in the sockets 66 and 67 and contacting with the rotating disc 56. While we have shown and prefer to use wipe spark contacts, a jump spark construction may be used. In passing, it may be mentioned that the disc 56 has a safety gap pin 68 adapted to cooperate with a metallic disc 69. Also, it may be noted that the inner surface of the disc 56 has corrugations 70 to break up the surface leakage thereacross.

The next step in the conversion of the magneto construction is shown in Figures 16 to 21 inclusive, wherein the magneto has been converted into a four-spark machine; that is, a machine adapted to fire a four-cylinder engine. In these figures, the frame 1 is the same as in the other types. The shaft end 5 of the rotor is the same, but the end 72 is different in that it is adapted to receive a pinion 73 adapted to mesh with a gear 74 carried on a stud 75 securely fastened to a bearing plate 76 which also carries the circuit breaker parts.

The gear 74 has external portions performing different functions and internal recesses performing other functions. One exterior portion has gear teeth cut therein; another carries a cam 79; and another carries a distributor disc. One internal recess, preferably that in approximate alignment with the gear teeth, carries an antifriction bearing 77 held in place as by a snap ring 78; another internal recess 80 provides space for lubricant for bearing 77; and another provides space for closing plug 82 to prevent the escape of lubricant from recess 80 and to permit the addition of lubricant when needed. In the particular form shown, recess 80 also provides space for screw 81 used for holding the gear unit onto the stud 75 and access to this screw 81 is through the recess normally closed by plug 82. It will be obvious that the precise character of these external portions and these internal recesses can be varied without departing from the scope of the invention.

As shown in Figure 19, the cam 79 may be made integral with the gear 74 along with the projecting portion 84 which receives the distributor disc 56, which is drivingly connected to the gear unit 74 through the medium of a slot 85.

Completing the enclosure around the distributor and circuit breaker parts, is a distributor block 86 having socket terminals 87, 88, 89 and 90, similar to 66 and 67 of Figures 13 and 14, for the purpose of picking up current from the distributor disc and delivering it to conductors to be attached to the socket members 87 to 90 inclusive. The distributor block 86 is provided with a projection 91 adapted to pass through a hole in the bearing plate 76 and into the cap 92 which is slightly different from the cap shown in the previous figures. The coil 46 is provided with a quill 93 which enters the projection 91 and terminates in a spring 94 seated in a metallic insert 95 which is connected by the conductor 96 to the contact member 59, the same as used in the construction of Figure 11. In this style of magneto the condenser 29 is fastened to the bearing plate 76 below the circuit breaker and distributor disc. The circuit connections, however, are similar to those already described.

On the inside of the distributor block is mounted a spring contact member 97 which is adapted to engage the terminal 33 on the condenser 29. The spring contact 97 is connected to a terminal piece 98 on the outside of the distributor block, to which a wire may be attached and carried to a control switch to ground the primary side of the magneto, as is the usual practice when the ignition of such a machine is desired to be shut off.

It will be clear to those skilled in the art that what we describe as a four-spark magneto is simply illustrative of the construction carrying internal gears and that the number of sparks producible with the type of construction may be one or any other number up to six or more as required. Similarly, what we describe as a two-spark magneto is illustrative of the construction not having internal gears and the number of sparks is without special significance.

From what has been said, it will be seen that we have provided a magneto which has a foundation member in the form of a frame around which different styles of machines may be built, thereby greatly reducing the cost of manufacture. Furthermore, it will be obvious that the details for carrying our invention into practice may be varied considerably without departing from the spirit of the invention or the scope of the appended claims.

What we claim is:

1. A convertible magneto including a foundation unit comprising; a frame structure integrally carrying oppositely disposed stationary field core parts spaced to receive a rotor therebetween and extending upwardly to receive thereon an ignition coil, and, a bearing mounted in the drive end of the frame; which terminates in substantially the same plane and a substantial distance below the finished top of the magneto, a removable bearing member fitting the breaker end of the frame and completing the closure of the frame at this end, an assistant housing means fitting directly onto said bearing member and forming therebetween a complete housing for spark-controlling devices, a bearing carried by said housing member, a rotor supported by said bearings, said rotor comprising shaft members and a permanent magnet carried thereby for cooperation with said field core parts; a high-tension ignition coil having a core member for engaging said field core parts, a single-piece cap for covering the coil removably mounted on the top of the frame, said cap having a projecting part through which electrical connection is made directly to the high-tension side of the coil, and means for controlling the action of the coil including a circuit breaker mechanism and a cam on the rotor shaft, both mounted within said housing formed between the assistant housing means and said removable bearing member.

2. A magneto as set forth in claim 1 further characterized in that the said housing carries therewithin a condenser and a primary externally extending grounding stud connected to the moving element of the circuit breaker by a spring which controls the movement of said element, the said spring also making contact with a terminal of the condenser.

3. A magneto as set forth in claim 1 further characterized in that the said housing carries therewithin a condenser and a primary externally extending grounding stud connected to the moving element of the circuit breaker by a spring which controls the movement of said element, the said spring also making contact with a terminal of the condenser, said spring having a notch in the side near one end to slip onto the condenser terminal while the extreme end beyond the notch is bent over but spaced from the condenser casing which is grounded and in the path of movement of the grounding stud.

4. In a magneto having a frame carrying field core parts spaced to receive a rotor therebetween, a bearing mounted in the drive end of the frame, a coil cap removably mounted on the top of the frame, an ignition coil housed within the cap and having a core for engaging said field core parts, a bearing member fastened to the end of the frame opposite the drive end and carrying the other rotor bearing and also having a bearing stud fastened thereto in spaced relation to the rotor, a pinion on the rotor meshing with a gear mounted on said stud, said gear having extended portions circuit breaker elements carried by said bearing member, a cam for actuating said breaker elements operatively positioned on an extended portion of said gear and a distributor disc carried by an extended portion of the gear, a distributor block fitting on said bearing member and having means for making electrical connection with the ignition winding of the coil and also with the distributor disc.

5. In a magneto as set forth in claim 4 further characterized in that the said gear has a recess on one face and a stepped hub of two diameters projecting from the other face, an anti-friction bearing for the gear mounted in said recess, while the cam is mounted on the hub portion of larger diameter and the distributor disc on the hub portion of smaller diameter.

6. In a magneto as set forth in claim 4 further characterized in that the said gear has a recess on one face and a stepped hub of two diameters projecting from the other face, an anti-friction bearing for the gear mounted in said recess, while the cam is formed directly on the hub portion of larger diameter and the distributor disc on the hub portion of smaller diameter.

7. In a magneto as set forth in claim 4 further characterized in that the said gear has exterior portions of three different diameters and interior inter-connected recesses correspondingly arranged, the exterior portion of larger diameter having gear teeth thereon while the corresponding interior recess has an anti-friction bearing mounted within it, a cam arranged on the exterior intermediate portion, a distributor disc mounted on the exterior portion of smaller diameter, the intermediate interior recess acting as a lubricant chamber for said gear bearing and also as space means to get at a holding device used to hold the gear to the said stud, while the recess of smaller diameter is utilized as space means to operate means for closing the entrance into the intermediate recess.

8. In a magneo as set forth in claim 4, further characterized in that the said gear has a recess on one side and a projecting hub on the other side, an anti-friction bearing for the gear mounted in said recess while the cam and distributor disc are mounted on the hub.

9. In a magneto as set forth in claim 4, further characterized in that the said gear has a recess on one side and a projecting hub on the other side, an anti-friction bearing for the gear mounted in said recess while the cam is formed directly on a portion of the hub and the distributor disc is mounted on another portion of the hub.

10. In a magneto as set forth in claim 4, further characterized in that the said gear has exterior portions and interior recesses, one exterior portion having gear teeth thereon, a cam arranged on another exterior portion and a distributor disc arranged on still another exterior portion, an anti-friction bearing for the gear mounted in one of said recesses, another of said recesses acting to carry lubricant for said gear bearing and also acting as space means to get at a holding device used to hold the gear to said stud, while another recess is utilized as space means to operate means for closing the entrance into the second mentioned recess.

11. In a magneto having a frame carrying field coil core parts space to receive a rotor therebetween, an ignition coil having a core engaging said core parts, a cap fitting the frame over said coil, a bearing mounted in the drive end of the frame, a bearing member fastened to the other end of the frame and carrying a bearing for a rotor, a rotor mounted on said bearing and having a permanent magnet for supplying flux to the field core parts and coil core, a stud fastened to said bearing member, a gear carrying an internally mounted anti-friction bearing mounted through the bearing on the stud, a pinion on the rotor in mesh with said gear, circuit breaker parts carried by the bearing member, cam means on the gear for operating the circuit breaker, a distributor disc carried on a projecting part of the gear and a distributor block attached to the bearing member and having internally mounted parts for making electrical connections to the coil and distributor disc.

12. In a magneto having a frame, a bearing member attached to the frame, a rotor carried by the frame and bearing member, an ignition coil excited by rotation of the rotor, a pinion on the rotor, a stud attached to the bearing member, a gear carrying an internally mounted anti-friction bearing mounted through the bearing on said stud, circuit breaker elements carried by said bearing member, cam means on an integral part of the gear for actuating one of the breaker elements, a distributor disc also carried on a part of the gear and a distributor block attached to the bearing member and having means for making electrical connections to the coil and distributor disc.

LE ROY S. DUNHAM.
ARTHUR F. ROBERTSON.